(12) United States Patent
Katayama et al.

(10) Patent No.: US 12,253,124 B2
(45) Date of Patent: Mar. 18, 2025

(54) CLUTCH DEVICE WITH CLAW MEMBER FOR SELECTIVELY LOCKING RINGS

(71) Applicant: NSK-Warner K.K., Tokyo (JP)

(72) Inventors: Osamu Katayama, Fukuroi (JP); Takashi Kurita, Fukuroi (JP)

( * ) Notice: Subject to any disclaimer, the term of this patent is extended or adjusted under 35 U.S.C. 154(b) by 0 days.

(21) Appl. No.: 18/523,940

(22) Filed: Nov. 30, 2023

(65) Prior Publication Data

US 2024/0191759 A1 Jun. 13, 2024

(30) Foreign Application Priority Data

Dec. 7, 2022 (JP) ................................. 2022-195423

(51) Int. Cl.
 *F16D 41/16* (2006.01)
 *F16D 41/14* (2006.01)

(52) U.S. Cl.
 CPC .............. *F16D 41/16* (2013.01); *F16D 41/14* (2013.01)

(58) Field of Classification Search
 CPC .... F16D 41/12–16; F16D 41/30; F16D 41/08; F16D 41/084
 See application file for complete search history.

(56) References Cited

U.S. PATENT DOCUMENTS

| | | | | |
|---|---|---|---|---|
| 7,484,605 B2* | 2/2009 | Pawley | ................. | F16D 41/125 192/43.1 |
| 7,500,548 B2* | 3/2009 | Kimes | ..................... | F16D 41/12 192/48.92 |
| 7,766,790 B2* | 8/2010 | Stevenson | ............. | B60W 10/06 477/6 |
| 8,042,669 B2* | 10/2011 | Samie | ..................... | F16D 41/12 192/43.1 |
| 8,491,439 B2* | 7/2013 | Kimes | ..................... | F16D 41/12 192/43.1 |
| 8,899,395 B2* | 12/2014 | Holmes | ................... | F16D 41/16 192/43.1 |
| 8,925,705 B2* | 1/2015 | Wys | ...................... | F16D 41/084 188/82.1 |

(Continued)

FOREIGN PATENT DOCUMENTS

| | | |
|---|---|---|
| CN | 111255823 | 6/2020 |
| JP | 2020-118250 | 8/2020 |
| JP | 2022-047794 | 3/2022 |

OTHER PUBLICATIONS

Extended Search Report in corresponding European Application No. 23211873.7, dated Apr. 22, 2024.

*Primary Examiner* — James J Taylor, II (74) *Attorney, Agent, or Firm* — SOEI PATENT & LAW FIRM (57) ABSTRACT

A clutch device includes an inner ring, an outer ring and claw members to selectively lock the rings of the clutch device. A first ring among the inner and outer rings has a toothed surface that faces a second ring among the inner and outer rings. The toothed surface includes a plurality of teeth arranged in a circumferential direction to protrude toward the second ring. A given tooth includes a first surface and a second surface that extend substantially radially, and a third surface that extends between the first surface and the second surface. The tooth has a first height at a first end of the third surface adjacent to the first surface and a second height at a second end of the third surface adjacent to the second surface, in which the first height is greater than the second height.

20 Claims, 7 Drawing Sheets

(56) References Cited

U.S. PATENT DOCUMENTS

| | | |
|---|---|---|
| 9,726,236 B2 | 8/2017 | Papania |
| 10,208,811 B2 * | 2/2019 | Greene .................. F16D 27/14 |
| 10,533,618 B2 * | 1/2020 | Kimes ..................... F16D 23/02 |
| 10,883,555 B2 * | 1/2021 | Campton ............... F16D 41/069 |
| 11,137,038 B2 * | 10/2021 | Hodge ................... F16D 41/16 |

* cited by examiner

CLUTCH DEVICE WITH CLAW MEMBER FOR SELECTIVELY LOCKING RINGS

CROSS-REFERENCE TO RELATED APPLICATIONS

This application is based upon and claims the benefit of priority from Japanese Patent Application No. 2022-195423, filed on Dec. 7, 2022, the entire contents of which are incorporated herein by reference.

BACKGROUND

A switchable ratchet type clutch device is capable of switching the state of torque transmission between an inner ring and an outer ring to each of a state where torque can be transmitted in both directions, a state where torque can be transmitted in only one direction, and a state where torque cannot be transmitted in both the directions (e.g., Japanese Unexamined Patent Publication No. 2020-118250).

SUMMARY

An example clutch device may include a first ring being one of an inner ring and an outer ring, a second ring being the other of the inner ring and the outer ring, a plurality of first claw members supported by the second ring, a plurality of second claw members supported by the second ring, a plurality of first biasing members supported by the second ring, and a plurality of second biasing members supported by the second ring. Each of the first claw members is movable along a plane perpendicular to an axial direction of the inner ring and the outer ring, and each of the first claw members includes a first end portion. Each of the second claw members is movable along the plane, and each of the second claw members includes a second end portion. The plurality of first biasing members bias the first end portion of each of the plurality of first claw members toward the first ring, and the plurality of second biasing members bias the second end portion of each of the plurality of second claw members toward the first ring. The clutch device is configured to selectively set a state of the plurality of first claw members and the plurality of second claw members, in which the state is selected among: a locked state where the first end portion and the second end portion are in contact with the first ring, a one-way state where the first end portion is in contact with the first ring and the second end portion is separated from the first ring, and a free state where the first end portion and the second end portion are separated from the first ring. The first ring may include a plurality of meshing teeth arranged in a circumferential direction of the first ring to protrude toward the second ring. Each of the plurality of meshing teeth includes a first surface extending substantially radially to contact the first end portion in the locked state, a second surface extending substantially radially to contact the second end portion in the locked state, and a third surface that is located between the first surface and the second surface to face the second ring, wherein the third surface inclines away from the second ring as the third surface extends in a direction from the first surface to the second surface.

Another example clutch device may include an inner ring formed around a central axis, an outer ring formed around the inner ring. A first ring among the inner ring and the outer ring has a toothed surface extending in a circumferential direction around the central axis, that faces a second ring among the inner ring and the outer ring. The example clutch device may further include a pair of claw members that are moveably coupled to the second ring pair of claw members to selectively lock the first ring relative to the second ring by engaging the toothed surface of the first ring. The toothed surface of the first ring includes a plurality of teeth arranged in the circumferential direction that protrude toward the second ring, and recesses arranged between the plurality of teeth. A given tooth among the plurality of teeth that is located between a first recess and a second recess among the plurality of recesses, includes a first surface extending substantially radially adjacent to the first recess, a second surface extending substantially radially adjacent to the second recess, and a third surface that extends between the first surface and the second surface to face the second ring. The given tooth has a first height at a first end of the third surface adjacent to the first surface, taken in a radial direction of the first ring relative to the first recess, and a second height at a second end of the third surface adjacent to the second surface taken in the radial direction relative to the second recess, in which the first height is greater than the second height.

Another example clutch device may include an inner ring formed around a central axis, and an outer ring formed around the inner ring, in which a first ring among the inner ring and the outer ring has a toothed surface extending in a circumferential direction around the central axis, that faces a second ring among the inner ring and the outer ring. The toothed surface of the first ring includes a plurality of teeth arranged in the circumferential direction to protrude toward the second ring. A given tooth among the plurality of teeth has an asymmetrical cross-sectional shape and forms an abutment surface that extends substantially radially relative to the central axis. A claw member that is coupled to the second ring, may move between a retracted position in which the claw member is spaced away from the first ring, and a contact position in which the claw member is biased toward the first ring to cause the claw member to abut against the abutment surface of the given tooth, so as to selectively lock the first ring relative to the second ring in a given rotational direction.

DETAILED DESCRIPTION

Hereinafter, with reference to the drawings, the same elements or similar elements having the same function are denoted by the same reference numerals, and redundant description will be omitted.

Figure 1:
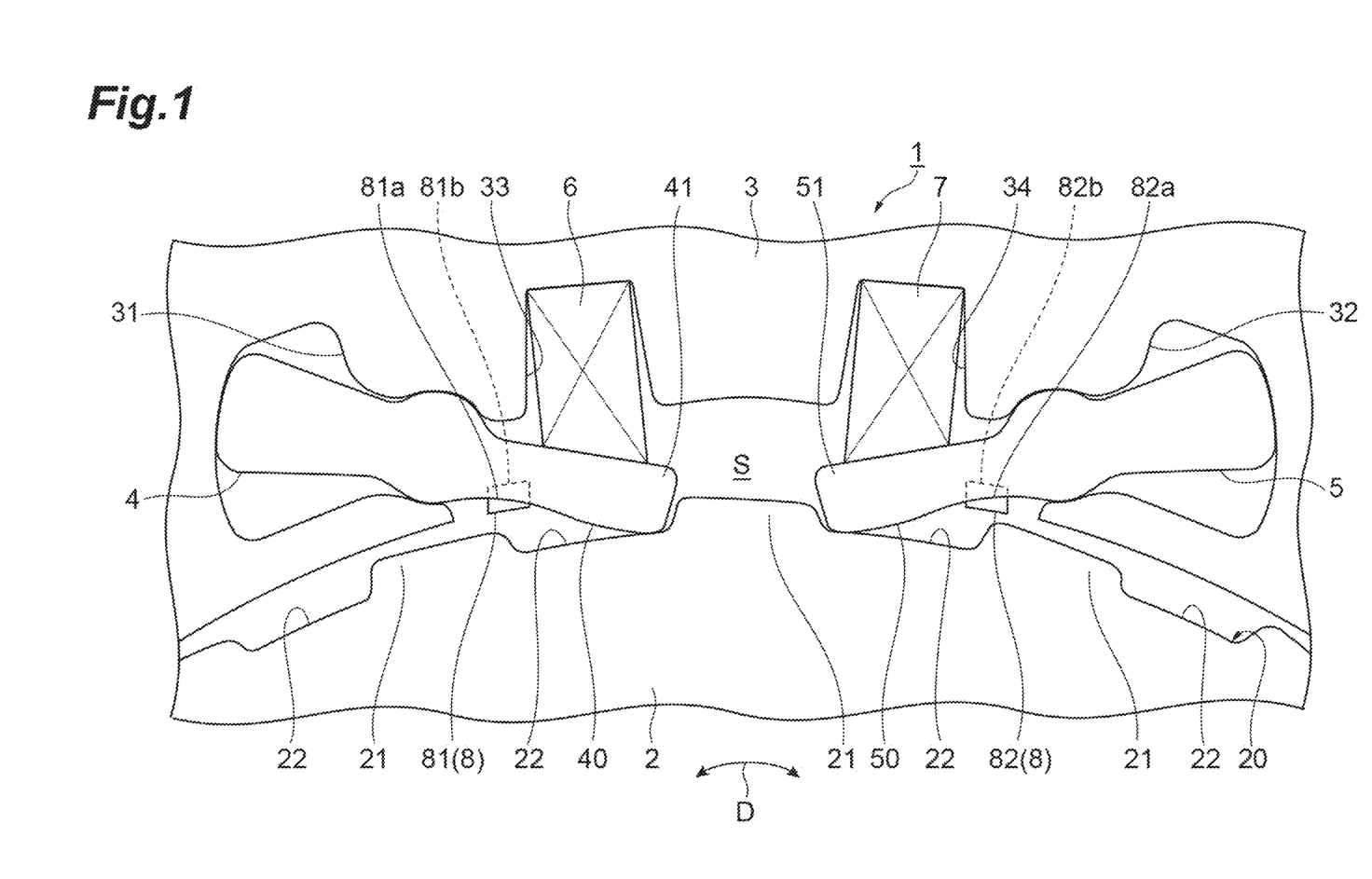
FIG. 1 is a partial front view of an example clutch device in a locked state.
Figure 7:
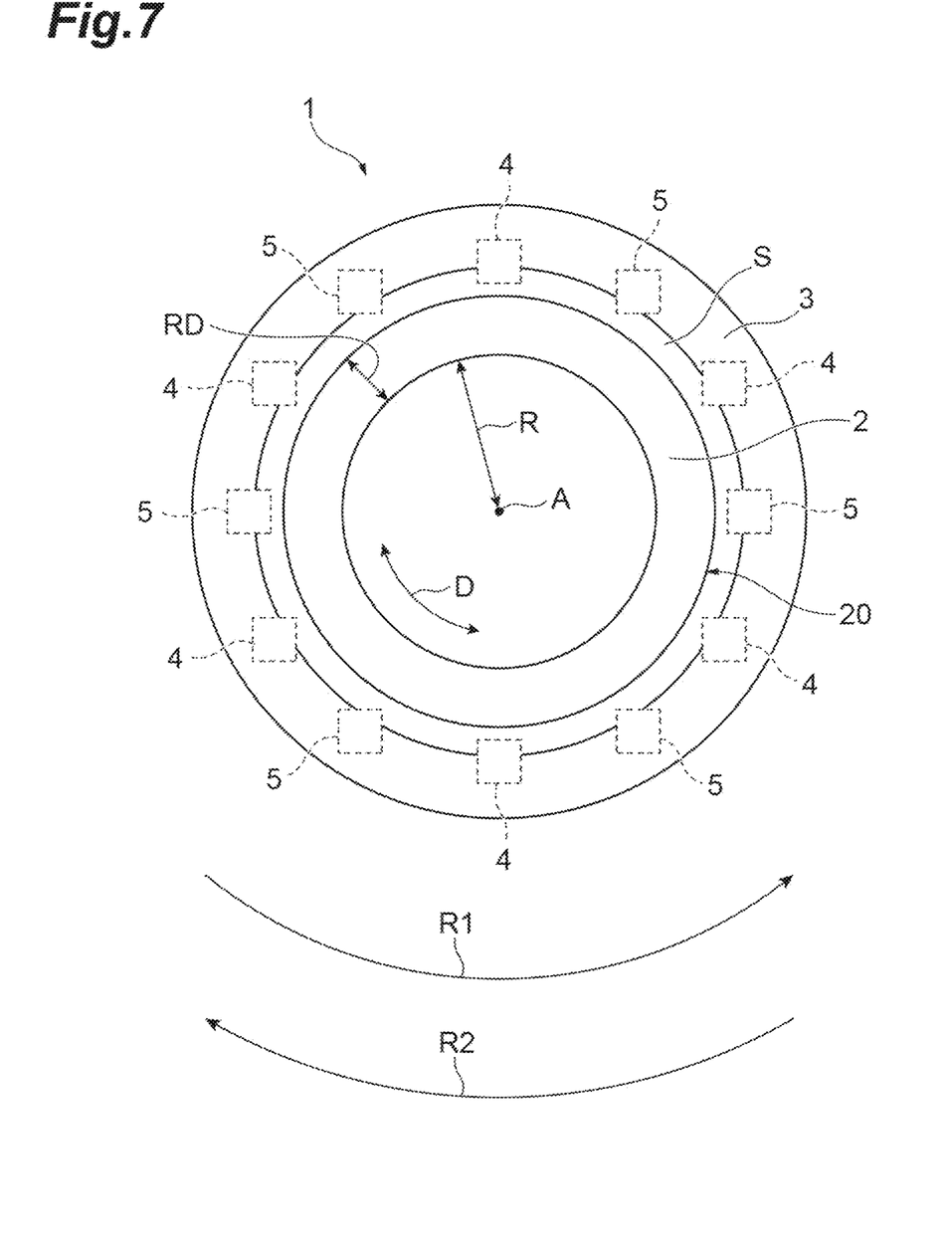
FIG. 7 is a schematic diagram illustrating an inner ring and an outer ring of an example clutch device.

As shown in FIGS. 1 and 7, a clutch device 1 includes an inner ring 2, an outer ring 3, a plurality of first claw members 4, a plurality of second claw members 5, a plurality of first biasing members 6, a plurality of second biasing members 7, and a switching mechanism 8. The clutch device 1 is a switchable ratchet type clutch device capable of switching the state of torque transmission between the inner ring 2 and the outer ring 3 to each of a state where torque can be transmitted in both directions, a state where torque can be transmitted in only one direction, and a state where torque cannot be transmitted in both the directions.

With reference to FIG. 7, the inner ring 2 is disposed with a predetermined axis (or center axis) A as the center line. The outer ring 3 is disposed outside the inner ring 2 with the same axis A as the inner ring 2 as the center line. A gap S is provided between the inner ring 2 and the outer ring 3.

Hereinafter, a direction parallel to the center line of the inner ring 2 and the outer ring 3 is referred to as an axial direction (axial direction of the inner ring 2 and the outer ring 3) A, a direction perpendicular to the center line is referred to as a radial direction (radial direction of the inner ring 2 and the outer ring 3) R, and a direction along a circumference having the center line as the center when viewed in the direction parallel to the center line is referred to as a circumferential direction (circumferential direction of the inner ring 2 and the outer ring 3) D. FIG. 1 shows a portion of the clutch device 1 in a circumferential direction D.

The inner ring 2 includes a plurality of meshing portions (or teeth) 21 formed on a toothed surface 20 that faces the outer ring 3. The plurality of meshing portions 21 protrude substantially radially toward an outer ring 3 side in an outer peripheral surface of the inner ring 2, and are arranged in the circumferential direction D along the outer peripheral surface of the inner ring 2. The plurality of meshing portions 21 are arranged at equal intervals in the circumferential direction D, and recesses 22 are formed between adjacent pairs of the meshing portions 21 along the toothed surface 20. In the clutch device 1, the inner ring 2 including the plurality of meshing portions 21 corresponds to a first ring being one of the inner ring 2 and the outer ring 3, and the outer ring 3 corresponds to a second ring being the other of the inner ring 2 and the outer ring 3.

The plurality of first claw members 4 are supported by the outer ring 3 such that each of the first claw members 4 is moveable (or oscillatable) along a plane perpendicular to the axial direction A. Each of the first claw members 4 is disposed in each of a plurality of recesses 31 formed on the outer ring 3, so that each of the first claw members 4 is moveable (or oscillatable) along the plane perpendicular to the axial direction A. Each of the recesses 31 is obliquely open on an inner peripheral surface of the outer ring 3 toward one side (right side in FIG. 1) in the circumferential direction D. Each of the first claw members 4 includes a first end portion 41 located in the gap S outside each of the recesses 31. The first end portion 41 is an end portion on the one side in the circumferential direction D.

The plurality of second claw members 5 are supported by the outer ring 3 such that each of the second claw members 5 is moveable (or oscillatable) along a plane perpendicular to the axial direction. Each of the second claw members 5 is disposed in each of a plurality of recesses 32 formed on the outer ring 3, so that each of the second claw members 5 is moveable (or oscillatable) along the plane perpendicular to the axial direction. Each of the recesses 32 is obliquely open on the inner peripheral surface of the outer ring 3 toward the other side (left side in FIG. 1) in the circumferential direction D. Each of the second claw members 5 includes a second end portion 51 located in the gap S outside each of the recesses 32. The second end portion 51 is an end portion on the other side in the circumferential direction D.

The plurality of first claw members 4 and the plurality of second claw members 5 are alternately arranged one by one in the circumferential direction D. FIG. 1 shows a pair of the first claw member 4 and the second claw member 5 of which the first end portion 41 and the second end portion 51 are close to each other.

The plurality of first biasing members 6 are supported by the outer ring 3. Each of the first biasing members 6 biases the corresponding first claw member 4 such that the first end portion 41 comes into contact with the inner ring 2. Each of the first biasing members 6 is a coil spring disposed in each of a plurality of respective recesses 33 formed on the outer ring 3. Each of the recesses 33 is open on the inner peripheral surface of the outer ring 3 to face an oscillating portion (or pivoting portion) 40 of the corresponding first claw member 4 in the radial direction, the oscillating portion 40 protruding from the corresponding recess 31. In each of the recesses 33, the first biasing member 6 is disposed in a compressed state between a bottom surface of the recess 33 and the oscillating portion 40 of the first claw member 4.

The plurality of second biasing members 7 are supported by the outer ring 3. Each of the second biasing members 7 biases the corresponding second claw member 5 such that the second end portion 51 comes into contact with the inner ring 2. Each of the second biasing members 7 is a coil spring disposed in each of a plurality of respective recesses 34 formed on the outer ring 3. Each of the recesses 34 is open on the inner peripheral surface of the outer ring 3 to face an oscillating portion (or pivoting portion) 50 of the corresponding second claw member 5 in the radial direction, the oscillating portion 50 protruding from the corresponding recess 32. In each of the recesses 34, the second biasing member 7 is disposed in a compressed state between a bottom surface of the recess 34 and the oscillating portion 50 of the second claw member 5.

Figure 2:
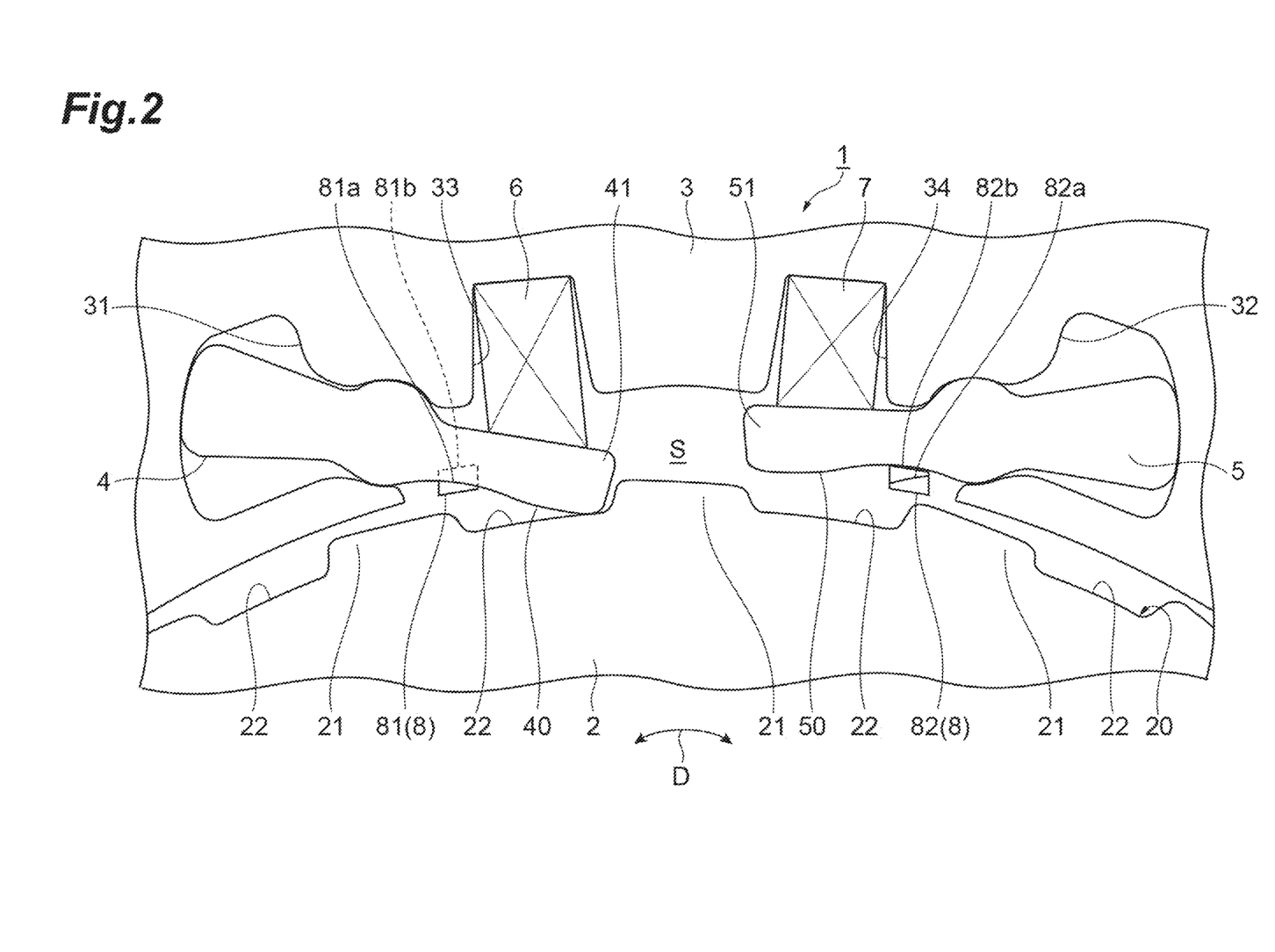
FIG. 2 is a partial front view of the clutch device shown in FIG. 1 in a one-way state.
Figure 3:
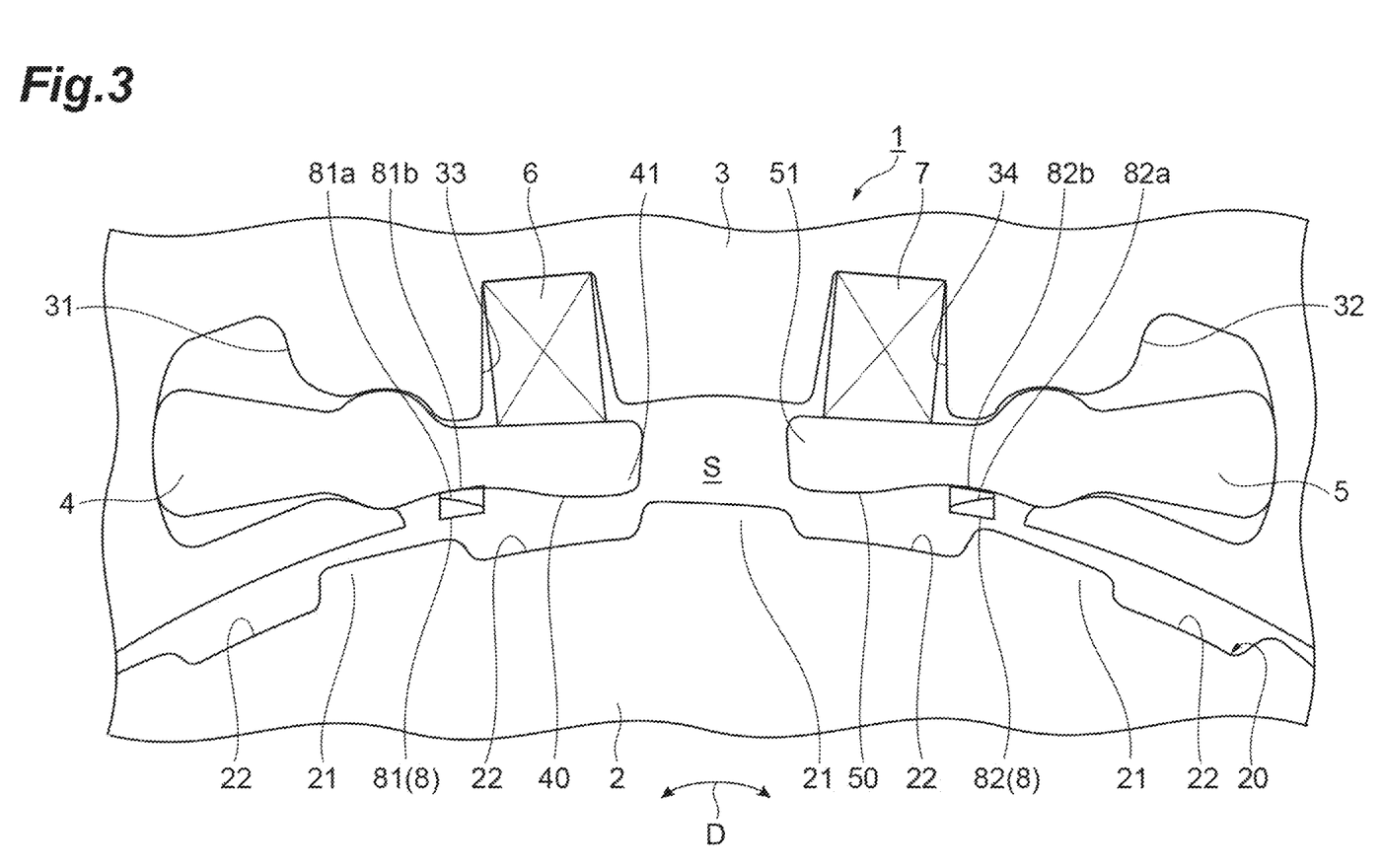
FIG. 3 is a partial front view of the clutch device shown in FIG. 1 in a free state.

The switching mechanism 8 switches the state of the plurality of first claw members 4 and the plurality of second claw members 5 to one of a locked state, a one-way state, and a free state. As shown in FIG. 1, the locked state is a state where the first end portion 41 of each of the first claw members 4 and the second end portion 51 of each of the second claw members 5 are in contact with the inner ring 2, and is a state where torque can be transmitted in both directions between the inner ring 2 and the outer ring 3. As shown in FIG. 2, the one-way state is a state where the first end portion 41 of each of the first claw members 4 is in contact with the inner ring 2 and the second end portion 51 of each of the second claw members 5 is separated from the inner ring 2, and is a state where torque can be transmitted in only one direction between the inner ring 2 and the outer ring 3. As shown in FIG. 3, the free state is a state where the first end portion 41 of each of the first claw members 4 and the second end portion 51 of each of the second claw members 5 are separated from the inner ring 2, and is a state where torque cannot be transmitted in both the directions between the inner ring 2 and the outer ring 3. Namely, the first claw member 4 is pivotally coupled to the outer ring 3 to move the end portion 41 between a retracted position in which the first claw member 4 is spaced away from the inner ring 2 (cf. FIG. 3), and a contact position in which the end portion 41 of the first claw member 4 is biased toward the inner ring 2 (cf. FIG. 1). Additionally, the second claw member 5 is pivotally coupled to the outer ring 3 to move the end portion 51 between a retracted position in which the second claw member 5 is spaced away from the inner ring 2 (cf. FIG. 2), and a contact position in which the end portion 51 of the second claw member 5 is biased toward the inner ring 2 (cf. FIG. 1). Accordingly, the switching mechanism 8 is configured to set both the first claw member 4 and the second claw member 5 in their respective contact positions to achieve the locked state of FIG. 1, to set the first claw member 4 in the contact position and the second claw member 5 in the retracted position to achieve the one-way state of FIG. 2, and to set both the first claw member 4 and the second claw member 5 in their respective retracted positions to achieve the free state of FIG. 3.

As one example, the switching mechanism 8 includes a plurality of first cam portions 81 and a plurality of second cam portions 82, as lifting actuators 81, 82, in order to retract the first claw members 4 and the second claw members 5 against the respective first biasing portions 6 and the second biasing portions 7. Each of the first cam portions 81 moves in the axial direction between the inner ring 2 and the oscillating portion 40 of each of the first claw members 4. Each of the second cam portions 82 moves in the axial direction between the inner ring 2 and the oscillating portion 50 of each of the second claw members 5. The plurality of first cam portions 81 and the plurality of second cam portions 82 are configured to integrally move in the axial direction. The plurality of first cam portions 81 and the plurality of second cam portions 82 are not rotatable relative to the outer ring 3.

Each of the first cam portions 81 has a first contact surface 81a and a second contact surface 81b arranged in the axial direction. The second contact surface 81b is located outside the first contact surface 81a in the radial direction. Each of the second cam portions 82 has a first contact surface 82a and a second contact surface 82b arranged in the axial direction. The second contact surface 82b is located outside the first contact surface 82a in the radial direction.

In the locked state shown in FIG. 1, the first contact surface 81a of each of the first cam portions 81 comes into contact with the oscillating portion 40 of the corresponding first claw member 4, and the first contact surface 82a of each of the second cam portions 82 comes into contact with the oscillating portion 50 of the corresponding second claw member 5. In the one-way state shown in FIG. 2, the first contact surface 81a of each of the first cam portions 81 comes into contact with the oscillating portion 40 of the corresponding first claw member 4, and the second contact surface 82b of each of the second cam portions 82 comes into contact with the oscillating portion 50 of the corresponding second claw member 5. In the free state shown in FIG. 3, the second contact surface 81b of each of the first cam portions 81 comes into contact with the oscillating portion 40 of the corresponding first claw member 4, and the second contact surface 82b of each of the second cam portions 82 comes into contact with the oscillating portion 50 of the corresponding second claw member 5.

Figure 4:
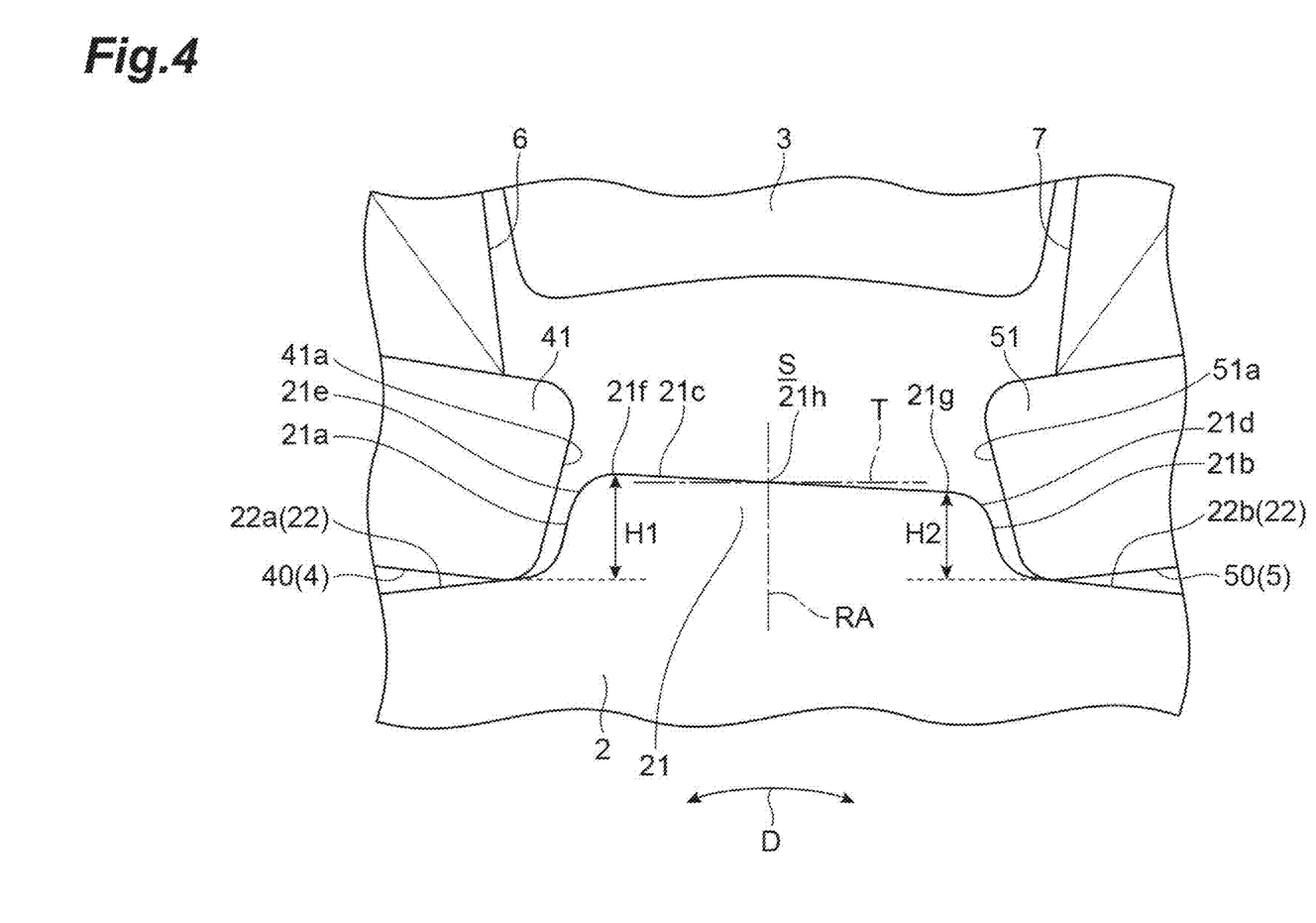
FIG. 4 is an enlarged view of a meshing portion of the clutch device shown in FIG. 1.

As shown in FIG. 4, each of the meshing portions 21 has a first surface 21a, a second surface 21b, and a third surface 21c. The first surface 21a, the second surface 21b, and the third surface 21c are surfaces parallel to the axial direction. The first surface 21a faces the other side (left side in FIG. 4) in the circumferential direction D to come into contact with the first end portion 41 of the first claw member 4 in the locked state. The second surface 21b faces the one side (right side in FIG. 4) in the circumferential direction D to come into contact with the second end portion 51 of the second claw member 5 in the locked state. The third surface 21c faces the outer ring 3 side between the first surface 21a and the second surface 21b. Namely, the first surface (also referred to herein as a first abutment surface) 21a and the second surface (also referred to herein as a second abutment surface) 21b extends substantially radially (e.g., substantially in the radial direction R). In the contact position of the first claw member 4, the first end portion 41 of the first claw member 4 is caused to abut against the first surface 21a of the adjacent tooth 21, so as to rotationally fix the inner ring 2 relative to the outer ring 3 in a first rotational direction R1 (cf. FIG. 7). Namely, the end portion 41 of the first claw member 4 includes a locking surface 41a that extends substantially parallel to the first surface 21a of the adjacent tooth 21 when the first claw member 4 is set to the contact position. Additionally, in the contact position of the second claw member 5, the second end portion 51 of the second claw member 5 is caused to abut against the second surface 21b of the adjacent tooth 21, so as to rotationally fix the inner ring 2 relative to the outer ring 3 in a second rotational direction R2 (cf. FIG. 7). Namely, the end portion 51 of the second claw member 5 includes a locking surface 51a that extends substantially parallel to the second surface 21b of the adjacent tooth 21 when the second claw member 5 is set to the contact position. In the one-way state illustrated in FIG. 2, the inner ring 2 is rotatable relative to the outer ring 3 in a single direction, such that the first end portion 41 of the first claw member 4 which is biased toward the inner ring 2, is caused to oscillate by sequentially contacting the teeth 21 and the recesses 22 as the inner ring 2 rotates relative to the outer ring 3.

The third surface 21c is inclined to approach the outer ring 3 as the third surface 21c approaches the first surface 21a, such that the third surface 21c inclines away from the second ring 2 as the third surface 21c extends in a direction from the first surface to the second surface. The third surface 21c is a flat (e.g., planar) inclined surface. For example, a first height H1 of the tooth 21 taken in the radial direction R at a first end 21f of the third surface 21c relative to an adjacent recess 22a, may be greater than a second height H2 of the tooth 21 taken in the radial direction R at a second end 21g of the third surface 21c, relative to an adjacent recess 22b. Accordingly, in a transverse cross-section of the inner ring 2 taken orthogonally to the central axis A, the tooth 21 has an asymmetrical shape. The height H1, H2 of the tooth 21 taken in the radial direction R relative to the adjacent recesses 22a, 22b may gradually increases along the inclined surface toward the first surface 21a. In some examples, a radial depth RD (cf. FIG. 7) of the inner ring 2 may increase along the inclined third surface 21c from the first end 21f to the second end 21g. Namely, the third surface is inclined (non-parallel) relative to a tangential plane T that extends orthogonally to a radial axis RA of the inner ring 2, with the radial axis intersecting a center point 21h of the third surface 21c in the circumferential direction D between the first end 21f and the second end 21g of the third surface 21c (cf. FIG. 4). In other words, the third surface 21c extends along a plane that is non-orthogonal to the radial axis (RA) of the first ring 2, that intersects the center point 21h of the inclined surface 21c. The third surface 21c is connected to the second surface 21b via a chamfered surface 21d having a rounded shape. Incidentally, the third surface 21c may be connected to the first surface 21a via a chamfered surface 21e having a rounded shape. In that case, a radius of the chamfered surface 21e formed between the first surface 21a and the third surface 21c may be larger than a radius of the chamfered surface 21d formed between the second surface 21b and the third surface 21c.

With reference to FIG. 4, the first surface 21a is a flat surface (e.g., planar surface) that is inclined to approach the second surface 21*b* as the first surface 21*a* approaches the outer ring 3 such that the third surface 21*c* inclines away from the second ring 2 as the third surface 21*c* extends from the first end 21*f* to the second end 21*g*. The first surface 21*a* is connected to a bottom surface of the first recess 22*a* via a chamfered surface having a rounded shape, the first recess 22*a* being located on the other side (left side in FIG. 4) in the circumferential direction D with respect to the meshing portion 21. The second surface 21*b* is a flat surface (e.g., planar surface) that is inclined to approach the first surface 21*a* as the second surface 21*b* approaches the outer ring 3. The second surface 21*b* is connected to a bottom surface of the second recess 22*b* via the chamfered surface 21*d* having a rounded shape, the second recess 22*b* being located on the one side (right side in FIG. 4) in the circumferential direction D with respect to the meshing portion 21. Accordingly, the planar surface of the first surface 21*a* inclines toward the second surface 21*b* as the first surface 21*a* extends toward the outer ring 3, and the planar surface of the second surface 21*b* inclines toward the first surface 21*a* as the second surface 21*b* extends toward the outer ring 3 so that the first surface 21*a* and the second surface 21*b* are tapered in the radial direction toward the outer ring 3. Both an angle formed by the first surface 21*a* and the third surface 21*c* and an angle formed by the second surface 21*b* and the third surface 21*c* are obtuse angles. The angle formed by the second surface 21*b* and the third surface 21*c* is larger than the angle formed by the first surface 21*a* and the third surface 21*c*.

Figure 5:
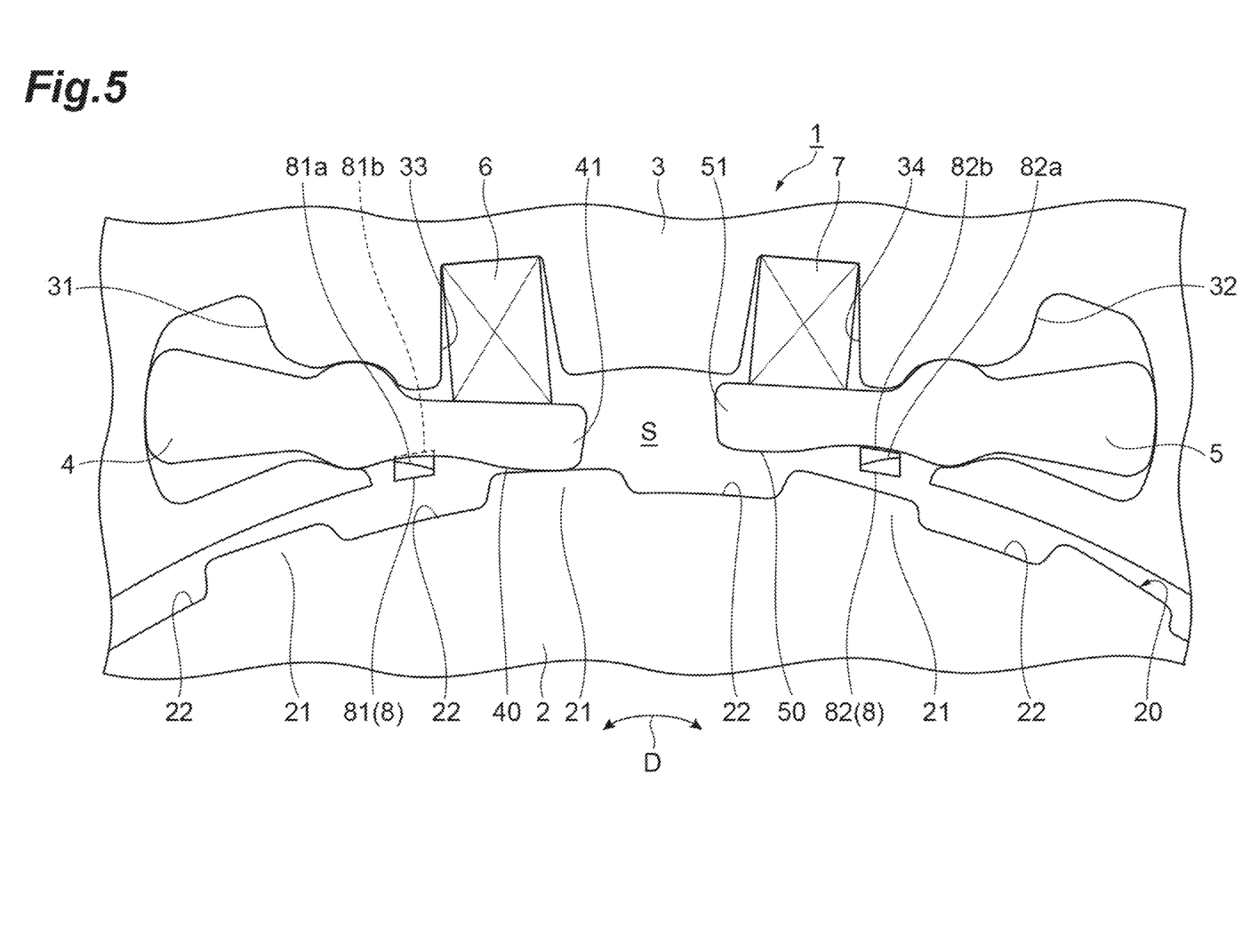
FIG. 5 is a partial front view of the clutch device shown in FIG. 1 in the one-way state.

As described above, in the clutch device 1, in each of the plurality of meshing portions 21 provided on the inner ring 2, the third surface 21*c* facing the outer ring 3 side is inclined to approach the outer ring 3 as the third surface 21*c* approaches the first surface 21*a* between the first surface 21*a* coming into contact with the first end portion 41 of the first claw member 4 in the locked state and the second surface 21*b* coming into contact with the second end portion 51 of the second claw member 5 in the locked state. Accordingly, as shown in FIGS. 2 and 5, when the inner ring 2 rotates freely with respect to the outer ring 3 in the one-way state, the first claw members 4 are less likely to move violently, and the behavior of the first claw members 4 is stabilized. For example, the oscillating movement of the first claw members 4 may be less abrupt, so as to lessen an impact of the first claw members 4 against the toothed surface 20 of the inner ring 2. Therefore, according to the clutch device 1, durability can be improved.

In the clutch device 1, the third surface 21*c* is connected to the second surface 21*b* via the chamfered surface 21*d*. Accordingly, the behavior of the first claw members 4 when the inner ring 2 rotates freely with respect to the outer ring 3 in the one-way state can be further stabilized.

In the clutch device 1, the third surface 21*c* is a flat inclined surface. Accordingly, the behavior of the first claw members 4 when the inner ring 2 rotates freely with respect to the outer ring 3 in the one-way state can be further stabilized.

Figure 6A:
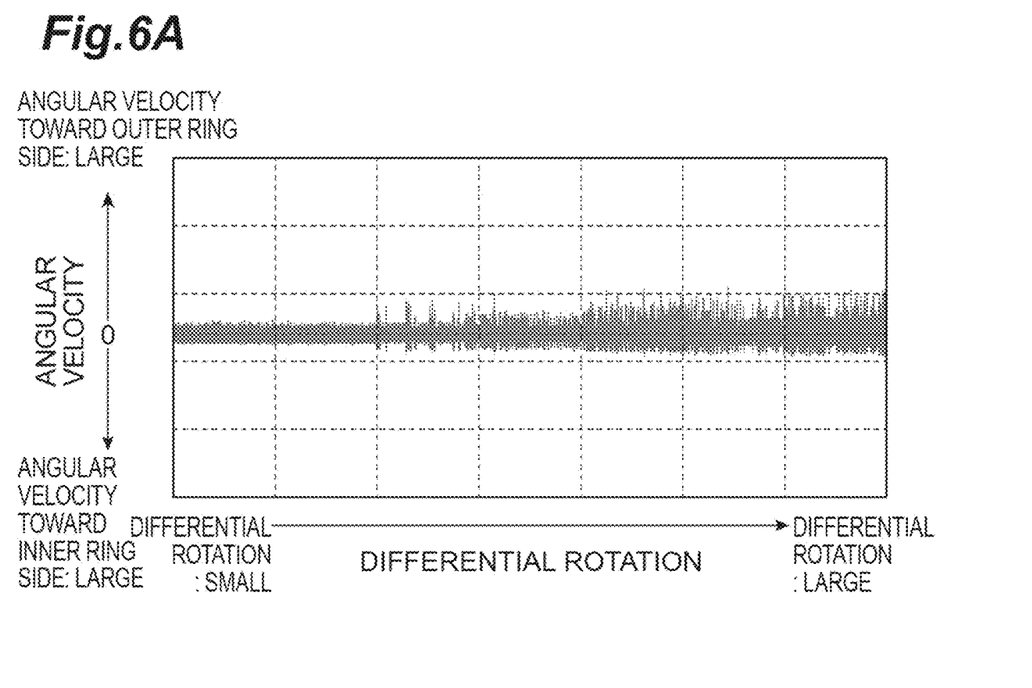
FIGS. 6A and 6B are graphs showing experimental results.
Figure 6B:
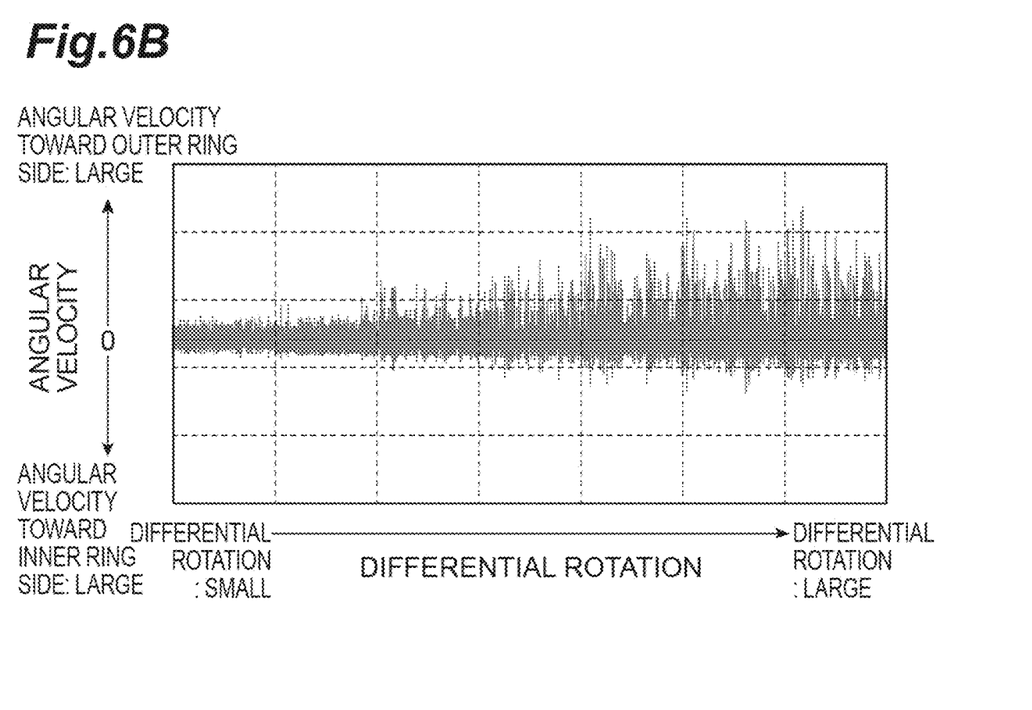

Here, experimental results will be described. FIG. 6A shows a relationship between "differential rotation between the inner ring 2 and the outer ring 3" and "angular velocity of the first end portion 41 of the first claw member 4" when the inner ring 2 rotates freely with respect to the outer ring 3 in the one-way state in the clutch device 1 of an example. FIG. 6B shows a relationship between "differential rotation between the inner ring 2 and the outer ring 3" and "angular velocity of the first end portion 41 of the first claw member 4" when the inner ring 2 rotates freely with respect to the outer ring 3 in the one-way state in a clutch device of a comparative example. The clutch device 1 of the example has the same configuration as the clutch device 1 described above. The clutch device of the comparative example is different from the clutch device 1 of the example in that the second surface 21*b* of each of the meshing portions 21 is line-symmetrical to the first surface 21*a* with respect to a center line of the meshing portion 21 and the third surface 21*c* is not inclined. As shown in FIGS. 6A and 6B, in the clutch device 1 of the example (FIG. 6A), compared to the clutch device of the comparative example (FIG. 6B), both the angular velocity toward an inner ring 2 side and the angular velocity toward the outer ring 3 side are kept low, particularly, the angular velocity toward the outer ring 3 side is kept low. This indicates that when the inner ring 2 rotates freely with respect to the outer ring 3 in the one-way state, in the clutch device 1 of the example, the first claw members 4 are less likely to move violently compared to the clutch device of the comparative example.

It is to be understood that the above-described examples may be suitably modified in various ways. For example, the outer ring 3 may include the plurality of meshing portions protruding toward the inner ring 2 side and arranged in the circumferential direction, and the inner ring 2 may support the plurality of first claw members 4, the plurality of second claw members 5, the plurality of first biasing members 6, and the plurality of second biasing members 7. Namely, in that case, the outer ring 3 including the plurality of meshing portions corresponds to the first ring being one of the inner ring 2 and the outer ring 3, and the inner ring 2 corresponds to the second ring being the other of the inner ring 2 and the outer ring 3.

In addition, in each of the meshing portions 21, the third surface 21*c* may be connected to the second surface 21*b* without the chamfered surface 21*d* interposed therebetween. In addition, in each of the meshing portions 21, the third surface 21*c* may be curved convexly or concavely when viewed in the axial direction.

In some examples, the clutch device 1 may be provided with a single pair of claw members including one first claw member 4 and one second claw member 5, and a single pair of corresponding biasing members 6, 7. In this case, the switching mechanism 8 may include a single pair of cam portions 81, 82. In other examples, the clutch device 1 may be provided with a single claw member 4 for example. In yet other examples, the clutch device 1 may be provided with a plurality of first claw members 4 to block the relative rotation of the inner and outer rings in the first rotational direction R1, without including any of the above-described second claw member 5. Alternatively, a plurality of second claw members 5 that block the relative rotation of the inner and outer rings in the second rotational direction R2 may be provided, without any of the above-described first claw member 4. In addition, although the plurality of teeth 21 formed on the toothed surface 20 may be shaped identically for example to include the above-described first surface 21*a*, second surface 21*b* and third surface 21*c*, it is to be understood that depending on examples, one or more of the teeth 21 may be shaped differently from the teeth 21 described above or from other teeth 21 of the toothed surface 20. In some examples, the tooth may include a single abutment surface that extends substantially radially and an inclined surface that slopes toward a recess opposite the single abutment surface.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A clutch device comprising:
a first ring being one of an inner ring and an outer ring;
a second ring being the other of the inner ring and the outer ring;
a plurality of first claw members supported by the second ring, wherein each of the first claw members is movable along a plane perpendicular to an axial direction of the inner ring and the outer ring, each of the first claw members including a first end portion;
a plurality of second claw members supported by the second ring, wherein each of the second claw members is movable along the plane, each of the second claw members including a second end portion;
a plurality of first biasing members supported by the second ring to bias the first end portion of each of the plurality of first claw members toward the first ring; and
a plurality of second biasing members supported by the second ring to bias the second end portion of each of the plurality of second claw members toward the first ring, wherein the clutch device is configured to selectively set a state of the plurality of first claw members and the plurality of second claw members, wherein the state is selected from a group consisting of: a locked state where the first end portions and the second end portions are in contact with the first ring; a one-way state where the first end portions are in contact with the first ring and the second end portion is portions are separated from the first ring; and a free state where the first end portions and the second end portions are separated from the first ring,
wherein the first ring includes a plurality of meshing teeth arranged in a circumferential direction of the first ring to protrude toward the second ring, and
wherein each of the plurality of meshing teeth includes:
a first surface extending substantially radially to contact a corresponding first end portion in the locked state;
a second surface extending substantially radially to contact a corresponding second end portion in the locked state; and
a third surface is located between the first surface and the second surface to face the second ring, wherein the third surface inclines away from the second ring as the third surface extends in a direction from the first surface to the second surface.

2. The clutch device according to claim 1, wherein the first ring is the inner ring, and the second ring is the outer ring.

3. The clutch device according to claim 1, wherein the third surface is connected to the second surface via a chamfered surface.

4. The clutch device according to claim 3,
wherein the third surface is connected to the first surface via a first chamfered surface that is rounded,
wherein the chamfered surface formed between the second surface and the third surface corresponds to a second chamfered surface that is rounded, and
wherein a radius of the first chamfered surface is greater than a radius of the second chamfered surface.

5. The clutch device according to claim 1, wherein the third surface is a planar inclined surface.

6. The clutch device according to claim 5,
wherein the first surface includes a planar surface that inclines toward the second surface as the first surface extends toward the second ring to form a first obtuse angle between the first surface and the third surface,
wherein the second surface includes a planar surface that inclines toward the first surface as the second surface extends toward the second ring to form a second obtuse angle between the second surface and the third surface, and
wherein the second obtuse angle is greater than the first obtuse angle.

7. A clutch device comprising:
an inner ring formed around a central axis;
an outer ring formed around the inner ring,
wherein a first ring among the inner ring and the outer ring has a toothed surface extending in a circumferential direction around the central axis, that faces a second ring among the inner ring and the outer ring,
wherein the toothed surface of the first ring includes a plurality of teeth arranged in the circumferential direction that protrude toward the second ring, and a plurality of recesses arranged between the plurality of teeth,
wherein a given tooth among the plurality of teeth is located between a first recess and a second recess among the plurality of recesses,
wherein the given tooth includes: a first surface extending substantially radially adjacent to the first recess; a second surface extending substantially radially adjacent to the second recess; and a third surface that extends between the first surface and the second surface to face the second ring,
wherein the given tooth has a first height at a first end of the third surface adjacent to the first surface, taken in a radial direction of the first ring relative to the first recess, and a second height at a second end of the third surface adjacent to the second surface, taken in the radial direction relative to the second recess, and wherein the first height is greater than the second height,
wherein the plurality of teeth are shaped identically to the given tooth to include corresponding first surfaces, second surfaces and third surfaces; and
a pair of claw members that are moveably coupled to the second ring, to selectively lock the first ring relative to the second ring by engaging the toothed surface of the first ring, wherein the pair of claw members includes:
a first claw member that is configured to move between a retracted position wherein the first claw member is spaced away from the first ring, and a contact position wherein the first claw member is biased toward the first ring to cause the first claw member to abut against a corresponding first surface of an adjacent tooth among the plurality of teeth of the first ring, so as to rotationally fix the first ring relative to the second ring in a first rotational direction; and
a second claw member that is configured to move between a retracted position wherein the second claw member is spaced away from the first ring, and a contact position wherein the second claw member is biased toward the first ring to cause the second claw member to abut against a corresponding second surface of the adjacent tooth among the plurality of teeth of the first ring, so as to rotationally fix the first ring relative to the second ring in a second rotational direction that is opposite to the first rotational direction, and wherein the clutch device is configured to selectively set a state of the first claw member and the second claw member, wherein the state is selected from a group consisting of: a locked state in which the first claw member and the second claw member are in their respective contact positions; a one-way state in which the first claw member is in the contact position and the second claw member is in the retracted position; and a free state in which both the first claw member and the second claw member are in their respective retracted positions.

8. The clutch device according to claim 7, wherein a height of the given tooth gradually decreases from the first height to the second height along the third surface and forms a planar surface that inclines away from the second ring as the third surface extends from the first end to the second end.

9. The clutch device according to claim 7, wherein the given tooth of the first ring includes:
a first rounded chamfer between the first surface and the third surface; and
a second rounded chamfer between the second surface and the third surface, wherein a radius of the first rounded chamfer is greater than a radius of the second rounded chamfer.

10. The clutch device according to claim 7, wherein an angle formed between the second surface and the third surface is greater than an angle formed between the first surface and the third surface.

11. The clutch device according to claim 7,
wherein the first surface and the second surface are tapered toward the second ring, to form a first obtuse angle between the first surface and the third surface and to form a second obtuse angle between the second surface and the third surface, and
wherein the second obtuse angle is greater than the first obtuse angle.

12. The clutch device according to claim 7, further comprising:
a plurality of first claw members including the first claw member, that are moveably coupled to the second ring, to abut against respective first surfaces of corresponding teeth among the plurality of teeth, when the first claw members are set in the contact position; and
a plurality of second claw members including the second claw member, that are moveably coupled to the second ring, to abut against respective second surfaces of corresponding teeth among the plurality of teeth, when the second claw members are set in the contact position.

13. The clutch device according to claim 7, further comprising:
a first biasing member coupled to the second ring to bias an end portion of the first claw member toward the first ring;
a first cam portion that is moveable toward the first claw member to lift the end portion of the first claw member away from the first ring in the retracted position of the first claw member;
a second biasing member coupled to the second ring to bias an end portion of the second claw member toward the first ring; and
a second cam portion that is movable toward the second claw member to lift the end portion of the second claw member away from the first ring in the retracted position of the second claw member, wherein the first claw member is pivotally coupled to the second ring to move the end portion of the first claw member between the retracted position and the contact position via a movement of the first cam portion toward and away from the first claw member, wherein the end portion of the first claw member includes a locking surface that extends substantially parallel to the corresponding first surface of the adjacent tooth when the first claw member is set to the contact position, wherein the second claw member is pivotally coupled to the second ring to move the end portion of the second claw member between the retracted position and the contact position via a movement of the second cam portion toward and away from the second claw member, and wherein the end portion of the second claw member includes a locking surface that extends substantially parallel to the corresponding second surface of the adjacent tooth when the second claw member is set to the contact position.

14. The clutch device according to claim 7,
wherein each of the plurality of recesses extend between a corresponding first tooth and a corresponding second tooth among the plurality of teeth, and
wherein each recess includes a bottom surface that extends substantially in the circumferential direction between a corresponding first surface of the corresponding first tooth and a corresponding second surface of the corresponding second tooth.

15. A clutch device comprising:
an inner ring formed around a central axis;
an outer ring formed around the inner ring,
wherein a first ring among the inner ring and the outer ring has a toothed surface extending in a circumferential direction around the central axis, that faces a second ring among the inner ring and the outer ring,
wherein the toothed surface of the first ring includes a plurality of teeth arranged in the circumferential direction to protrude toward the second ring,
wherein the toothed surface of the first ring forms a plurality of recesses between the plurality of teeth,
wherein a given tooth among the plurality of teeth, includes a first surface that extends substantially radially relative to the central axis, a second surface extending substantially radially opposite the first surface, and a third surface extending between the first surface and the second surface to face the second ring,
wherein the third surface has a height taken in a radial direction of the first ring from an adjacent recess among the plurality of recesses, wherein the height of the given tooth taken along the third surface increases toward the first surface, and
wherein the given tooth includes:
a first chamfer between the first surface and the third surface, that has a rounded shape; and
a second chamfer between the second surface and the third surface, that has a rounded shape, wherein a radius of the first chamfer is greater than a radius of the second chamfer; and
a claw member that is coupled to the second ring to move between a retracted position wherein the claw member is spaced away from the first ring and a contact position wherein the claw member is biased toward the first ring to cause the claw member to abut against the first surface of the given tooth, so as to selectively lock the first ring relative to the second ring in a given rotational direction.

16. The clutch device according to claim 15,
wherein the third surface forms an inclined surface having a center point in the circumferential direction, that intersects a radial axis of the first ring, and
wherein the inclined surface extends along a plane that is non-orthogonal to the radial axis.

17. The clutch device according to claim 15, wherein the first surface and the second surface are tapered in the radial direction to form a first obtuse angle between the first surface and the third surface and to form a second obtuse angle between the second surface and the third surface that is greater than the first obtuse angle.

18. The clutch device according to claim 15,
wherein the plurality of teeth are shaped identically to the given tooth to form respective first surfaces, second surfaces and third surfaces,
wherein the clutch device further comprises:
    a plurality of first claw members including the claw member, that are coupled to the second ring to move between respective retracted positions wherein the first claw members are spaced away from the first ring and respective contact positions wherein the first claw members are biased toward the first ring to cause the first claw members to abut against respective first surfaces of corresponding teeth among the plurality of teeth of the first ring; and
    a plurality of second claw members that are coupled to the second ring to move between respective retracted positions wherein the second claw members are spaced away from the first ring and respective contact positions wherein the second claw members are biased toward the first ring to cause the second claw members to abut against respective second surfaces of corresponding teeth among the plurality of teeth of the first ring, and
wherein the first claw members and the second claw members are controllable to set a state selected from a group consisting of: a locked state in which the first claw members and the second claw members are in their respective contact positions; a one-way state in which the first claw members are in their respective contact positions and the second claw members are in their respective retracted positions; and a free state in which the first claw members and the second claw members are in their respective retracted positions.

19. The clutch device according to claim 15,
wherein the given tooth corresponds to a first tooth,
wherein the plurality of teeth include a second tooth positioned adjacent to the first tooth,
wherein the second tooth includes a first surface extending substantially radially, a second surface extending substantially radially opposite to the first surface of the second tooth, and a third surface extending between the first surface and the second surface of the second tooth,
wherein a given recess among the plurality of recesses extends between the first tooth and the second tooth, and
wherein the recess includes a bottom surface that extends substantially in the circumferential direction between the first surface of the first tooth and the second surface of the second tooth.

20. The clutch device according to claim 19,
wherein the first surface of the first tooth is connected to the bottom surface of the given recess via a first chamfered surface having a rounded shape, and
wherein the second surface of the second tooth is connected to the bottom surface of the given recess via a second chamfered surface having a rounded shape.

* * * * *